United States Patent
Mitchell et al.

(10) Patent No.: US 11,288,859 B2
(45) Date of Patent: Mar. 29, 2022

(54) REAL-TIME FEATURE PRESERVING RENDERING OF VISUAL EFFECTS ON AN IMAGE OF A FACE

(71) Applicant: Disney Enterprises, Inc., Burbank, CA (US)

(72) Inventors: Kenneth J. Mitchell, San Jose, CA (US); Llogari Casas Cambra, Terrassa (ES); Yue Li, Beijing (CN)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 16/889,557

(22) Filed: Jun. 1, 2020

(65) Prior Publication Data

US 2021/0375029 A1    Dec. 2, 2021

(51) Int. Cl.

| | |
|---|---|
| *G06T 15/00* | (2011.01) |
| *G06T 15/20* | (2011.01) |
| *G06T 7/50* | (2017.01) |
| *G06T 15/50* | (2011.01) |
| *G06T 7/11* | (2017.01) |
| *G06T 3/40* | (2006.01) |

(52) U.S. Cl.
CPC .......... *G06T 15/205* (2013.01); *G06T 3/4092* (2013.01); *G06T 7/11* (2017.01); *G06T 7/50* (2017.01); *G06T 15/506* (2013.01); *G06T 2207/10028* (2013.01); *G06T 2207/30201* (2013.01)

(58) Field of Classification Search
CPC ..... G06T 17/20; G06T 17/55; G06T 2200/08; G06T 2200/24
USPC .......................................................... 345/418
See application file for complete search history.

(56) References Cited

U.S. PATENT DOCUMENTS

| 7,103,211 B1 * | 9/2006 | Medioni | G06T 17/10 |
| | | | 382/118 |
| 9,563,033 B2 * | 2/2017 | Laroia | G03B 17/17 |
| 10,198,859 B2 * | 2/2019 | Hare | G06K 9/00201 |
| 10,515,480 B1 * | 12/2019 | Hare | G06T 17/20 |

(Continued)

OTHER PUBLICATIONS

Su CC, Cormack LK, Bovik AC. Bayesian depth estimation from monocular natural images. Journal of vision. May 1, 2017;17(5):22.*

(Continued)

*Primary Examiner* — Phu K Nguyen
(74) *Attorney, Agent, or Firm* — Patterson + Sheridan, LLP

(57) ABSTRACT

Embodiments provide techniques for rendering augmented reality effects on an image of a user's face in real time. The method generally includes receiving an image of a face of a user. A global facial depth map and a luminance map are generated based on the captured image. The captured image is segmented into a plurality of segments. For each segment in the plurality of segments, a displacement energy of the respective segment is minimized using a least square minimization of a linear system for the respective segment. The displacement energy is generally defined by a relationship between a detailed depth map, the global facial depth map and the luminance map. The detailed depth map is generated based on the minimized displacement energy for each segment in the plurality of segments. One or more visual effects are rendered over the captured image using the generated detailed depth map.

20 Claims, 6 Drawing Sheets

(56) References Cited

U.S. PATENT DOCUMENTS

| | | | | |
|---|---|---|---|---|
| 10,565,722 | B1* | 2/2020 | Baker | G06T 7/0051 |
| 11,010,968 | B2* | 5/2021 | Hare | G06T 17/20 |
| 2017/0310946 | A1* | 10/2017 | Ge | H04N 13/286 |
| 2020/0082160 | A1* | 3/2020 | Li | G06N 3/02 |
| 2020/0302652 | A1* | 9/2020 | Lasserre | G06T 9/40 |

OTHER PUBLICATIONS

Saxena A, Chung SH, Ng AY. 3-d depth reconstruction from a single still image. International journal of computer vision. Jan. 1, 2008;76(1):53-69.*

Blumenthal-Barby DC, Eisert P. High-resolution depth for binocular image-based modeling. Computers & Graphics. Apr. 1, 2014;39:89-100.*

Nishimura M, Lindell DB, Metzler C, Wetzstein G. Disambiguating Monocular Depth Estimation with a Single Transient. InEuropean Conference on Computer Vision Aug. 23, 2020 (pp. 139-155). Springer, Cham.*

Zuo, Xinxin. "Depth Enhancement and Surface Reconstruction with RGB/D Sequence." (2019).*

Atick JJ, Griffin PA, Redlich AN. Statistical approach to shape from shading: Reconstruction of three-dimensional face surfaces from single two-dimensional images. Neural computation. Aug. 1996;8(6):1321-40.*

Chen A, Chen Z, Zhang G, Mitchell K, Yu J. Photo-realistic facial details synthesis from single image. InProceedings of the IEEE/CVF International Conference on Computer Vision 2019 (pp. 9429-9439).*

Richardson E, Sela M, Or-El R, Kimmel R. Learning detailed face reconstruction from a single image. InProceedings of the IEEE conference on computer vision and pattern recognition 2017 (pp. 1259-1268).*

Xu S, Yang J, Chen D, Wen F, Deng Y, Jia Y, Tong X. Deep 3D Portrait from a Single Image. arXiv preprint arXiv:2004.11598. Apr. 24, 2020.*

Milgram, P, Takemura, H, Utsumi, a, Kishino, F. Mixed Reality ( MR ) Reality-Virtuality (RV) Continuum. Systems Research 1994;2351(Telemanipulator and Telepresence Technologies):282-292.

Williams, L. Performance-driven facial animation. In: Proceedings of the 17th Annual Conference on Computer Graphics and Interactive Techniques. SIGGRAPH '90; New York, NY, USA: ACM. ISBN 0-89791-344-2; 1990, p. 235-242.

Guenter, B, Grimm, C, Wood, D, Malvar, H, Pighin, F. Making faces. In: Proceedings of the 25th Annual Conference on Computer Graphics and Interactive Techniques. SIGGRAPH '98; New York, NY, USA: ACM. ISBN 0-89791-999-8; 1998, p. 55-66.

Blanz, V, Vetter, T. Face recognition based on fitting a 3d morphable model. IEEE Transactions on Pattern Analysis and Machine Intelligence 2003;25(9): 1063-1074.

Xiangyu Zhu, , Lei, Z, Junjie Yan, , Yi, D, Li, SZ. High-fidelity pose and expression normalization for face recognition in the wild. In: 2015 IEEE Conference on Computer Vision and Pattern Recognition (CVPR). 2015, p. 787-796.

Cao, C, Hou, Q, Zhou, K. Displaced dynamic expression regression for real-time facial tracking and animation. ACM Trans Graph 2014;33(4):43:1-43:10.

Thies, J, Zollhöfer, M, Stamminger, M, Theobalt, C, Nießner, M. Face2face: Real-time face capture and reenactment of rgb videos. In: 2016 IEEE Conference on Computer Vision and Pattern Recognition (CVPR). 2016, p. 2387-2395.

Beeler, T, Bickel, B, Beardsley, P, Sumner, B, Gross, M. High-quality single-shot capture of facial geometry. ACM Trans Graph 2010;29(4):40:1-40:9. URL: http://doi.acm.org/10.1145/ 1778765. 1778777.

Li, Y, Ma, L, Fan, H, Mitchell, K. Feature-preserving detailed 3d face reconstruction from a single image. In: Proceedings of the 15th ACM SIGGRAPH European Conference on Visual Media Production. CVMP '18; New York, NY, USA: ACM. ISBN 978-1-4503-6058-6; 2018, p. 1:1-1:9.

Booth, J, Roussos, A, Zafeiriou, S, Ponniahy, A, Dunaway, D. A 3d morphable model learnt from 10,000 faces. In: 2016 IEEE Conference on Computer Vision and Pattern Recognition (CVPR). 2016, p. 5543-5552.

Guo, Y, Zhang, J, Cai, J, Jiang, B, Zheng, J. Photo-realistic face images synthesis for learning-based fine-scale 3d face reconstruction. CoRR 2017;abs/1708.00980.

Richardson, E, Sela, M, Or-El, R, Kimmel, R. Learning detailed face reconstruction from a single image. 2017, p. 5553-5562.

Tuan Tran, A, Hassner, T, Masi, I, Medioni, G. Regressing robust and discriminative 3d morphable models with a very deep neural network. 2017, p. 1493-1502.

Jourabloo, A, Liu, X. Large-pose face alignment via cnn-based dense 3d model fitting. In: 2016 IEEE Conference on Computer Vision and Pattern Recognition (CVPR). 2016, p. 4188-4196.

Liu, F, Zhao, Q, x. Liu, , Zeng, D. Joint face alignment and 3d face reconstruction with application to face recognition. IEEE Transactions on Pattern Analysis and Machine Intelligence 2018;:1-1.

Zhu, X, Lei, Z, Liu, X, Shi, H, Li, S. Face alignment across large poses: A 3d solution. 2016, p. 146-155.

Jiang, L, Zhang, J, Deng, B, Li, H, Liu, L. 3d face reconstruction with geometry details from a single image. IEEE Transactions on Image Processing 2017; 15 pages.

Sela, M, Richardson, E, Kimmel, R. Unrestricted facial geometry reconstruction using image-to-image translation 2017; 10 pages.

Tewari, A, Zollhofer, M, Kim, H, Garrido, P, Bernard, F, Perez, P, et al. Mofa: Model-based deep convolutional face autoencoder for unsupervised monocular reconstruction 2017, p. 1274-1283.

Tuan Tran, A, Hassner, T, Masi, I, Medioni, G. Regressing robust and discriminative 3d morphable models with a very deep neural network 2016; 10 pages.

Sengupta, S, Kanazawa, A, D. Castillo, C, W. Jacobs, D. Sfsnet: Learning shape, reflectance and illuminance of faces in the wild. 2018, p. 6296-6305.

Cao, C, Bradley, D, Zhou, K, Beeler, T. Real-time high-fidelity facial performance capture. ACM Trans Graph 2015;34(4):46:1-16 9.

Garrido, P, Zollhöfer, M, Casas, D, Valgaerts, L, Varanasi, K, P'erez, P, et al. Reconstruction of personalized 3d face rigs from monocular video. ACM Trans Graph 2016;35(3):28:1-28:15.

Roth, J, Tong, Y, Liu, X. Unconstrained 3d face reconstruction. 2015; 10 pages.

Roth, J, Tong, Y, Liu, X. Adaptive 3d face reconstruction from unconstrained photo collections. In: 2016 IEEE Conference on Computer Vision and Pattern Recognition (CVPR). 2016, p. 4197-4206.

Trigeorgis, G, Snape, P, Kokkinos, I, Zafeiriou, S. Face normals "inthe-wild" using fully convolutional networks. In 2017 IEEE Conference on Computer Vision and Pattern Recognition (CVPR). 2017, p. 340-349.

Richardson, E, Sela, M, Kimmel, R. 3d face reconstruction by learning from synthetic data. 2016, p. 460-469.

ARKit, . Apple ARKit. https://developer.apple.com/arkit/. 2019; 4 pages.

Casas, L, Herrera, G. Creating an Interactive Mirror Experience through Web technologies. International Journal of Scientific and Research Publications 2015;5(12):3-6.

Javornik, A, Rogers, Y, Moutinho, AM, Freeman, R. Revealing the shopper experience of using a "magic mirror" augmented reality make-up application. In: Proceedings of the 2016 ACM Conference on Designing Interactive Systems. DIS '16; New York, NY, USA: ACM. ISBN 978-1-4503-4031-1; 2016, p. 871-882.

Maninchedda, F, Häne, C, Oswald, MR, Pollefeys, M. Face reconstruction on mobile devices using a height map shape model and fast regularization. In: 2016 Fourth International Conference on 3D Vision (3DV). 2016, p. 489-498.

* cited by examiner

REAL-TIME FEATURE PRESERVING RENDERING OF VISUAL EFFECTS ON AN IMAGE OF A FACE

BACKGROUND

Field

Aspects of the present disclosure relate to augmented reality systems, and more specifically to using augmented reality systems to render depth-accurate effects on an image of a user's face in real time.

Description of the Related Art

Augmented reality systems generally are systems in which computer-rendered effects are displayed (e.g., overlaid on) in conjunction with a real-world environment. These augmented reality systems may include augmented reality systems deployed on mobile devices (e.g., smartphones, tablets, etc.), head-mounted displays, digital displays (e.g., augmented reality mirrors), and the like). In augmented reality systems, various effects can be rendered to augment a real-world environment or images captured of the real-world environment in which the augmented reality systems operate. For example, a simple augmented reality system may render additional objects and display these rendered objects in such a manner that the additional objects appear to be part of the real-world environment. In another example, lighting effects can be rendered in an augmented reality system to add artificial lighting to the real-world environment.

Rendering augmented reality effects is generally a task that varies in computational complexity. Simple systems in which objects are overlaid on the real-world environment may be a computationally inexpensive process. More complex effects, however, may have a degree of complexity that makes it impractical to generate and render these effects in real-time. For example, rendering visual effects over a large surface area may increase in complexity as the amount of detail to include in the rendered effect increases. In one application, rendering photo-realistic facial effects may be a computationally complex task that may necessitate the use of multiple images and significant processing capabilities (e.g., as provided by clusters of central processing units, graphics processing units, neural processing units, or the like), which may be impractical in many applications (e.g., for rendering such effects on mobile devices or other devices which may have more limited computing capabilities than a cluster of processors). Further, because of the complexity of rendering visual effects including large amounts of detail to render, rendering such effects in real-time may be impractical and may be performed offline.

SUMMARY

One embodiment described herein is a method for rendering augmented reality effects on an image of a user's face in real time. The method generally includes receiving an image of a face of a user. A global facial depth map and a luminance map are generated based on the captured image. The captured image is segmented into a plurality of segments. For each segment in the plurality of segments, a displacement energy of the respective segment is minimized using a least square minimization of a linear system for the respective segment. The displacement energy is generally defined by a relationship between a detailed depth map, the global facial depth map and the luminance map. The detailed depth map is generated based on the minimized displacement energy for each segment in the plurality of segments. One or more visual effects are rendered over the captured image using the generated detailed depth map.

Another embodiment described herein is a system for rendering augmented reality effects on an image of a user's face in real time. The system generally includes a processor and a memory. The memory generally stores instructions that, when executed by the processor, perform an operation. The operation generally includes receiving an image of a face of a user. A global facial depth map and a luminance map are generated based on the captured image. The captured image is segmented into a plurality of segments. For each segment in the plurality of segments, a displacement energy of the respective segment is minimized using a least square minimization of a linear system for the respective segment. The displacement energy is generally defined by a relationship between a detailed depth map, the global facial depth map and the luminance map. The detailed depth map is generated based on the minimized displacement energy for each segment in the plurality of segments. One or more visual effects are rendered over the captured image using the generated detailed depth map.

Still another embodiment described herein is a computer-readable medium having instructions stored thereon which, when executed by a processor, performs an operation for rendering augmented reality effects on an image of a user's face in real time. The operation generally includes receiving an image of a face of a user. A global facial depth map and a luminance map are generated based on the captured image. The captured image is segmented into a plurality of segments. For each segment in the plurality of segments, a displacement energy of the respective segment is minimized using a least square minimization of a linear system for the respective segment. The displacement energy is generally defined by a relationship between a detailed depth map, the global facial depth map and the luminance map. The detailed depth map is generated based on the minimized displacement energy for each segment in the plurality of segments. One or more visual effects are rendered over the captured image using the generated detailed depth map.

BRIEF DESCRIPTION OF THE DRAWINGS

So that the manner in which the above recited aspects are attained and can be understood in detail, a more particular description of embodiments described herein, briefly summarized above, may be had by reference to the appended drawings.

It is to be noted, however, that the appended drawings illustrate typical embodiments and are therefore not to be considered limiting; other equally effective embodiments are contemplated.

DETAILED DESCRIPTION

Embodiments of the present disclosure describe augmented reality systems that render visual effects over a user's face in a captured image in real-time. In one embodiment, a global luminance map and a global depth map are generated over the user's face in the captured image. The captured image is segmented into a plurality of segments which can be processed in parallel using the global luminance map and global depth map to minimize a displacement energy in each segment containing at least a portion of the user's face (e.g., using a least square minimization technique). Using the minimized energy for each segment of the captured image, a detailed depth map may be generated. The detailed depth map may preserve three-dimensional detail in the user's face (unlike the global depth map, which is generally a low-geometry map that preserves major facial details but does not include fine details of the user's face) and may be used by a rendering engine to render one or more visual effects over the user's face in a manner that also preserves three-dimensional detail in the rendered visual effects. For example, the depth map may preserve information such as wrinkles, detailed facial expressions (e.g., dimples, crow's feet, etc.), facial hair, and other fine detail in effects rendered over the user's face.

By segmenting a captured image into a plurality of segments and generating a detailed depth map for the user's face by processing each segment in the plurality of segments in parallel using a global luminance map and a global depth map in a least square minimization technique, embodiments presented herein may allow for real-time reconstruction of facial detail and rendering of visual effects using processing units of varying computational capabilities. Real-time reconstruction of facial detail and rendering of visual effects in a detail preserving manner may be performed, for example, by mobile devices (e.g., smartphones, tablets, etc.) or other devices with limited processing capabilities using inputs obtained from a live stream of images captured by these devices. Further, unlike techniques that render visual effects on a user's face that sacrifice detail when executed on mobile devices or other devices with limited computing capabilities or involve delayed processing due to computational expense, embodiments presented herein allow for detail captured in an image of a user's face to be preserved in visual effects rendered over the user's face in the image in real time. Real-time reconstruction of facial detail and rendering of visual effects may, thus, allow for visual effects to be rendered over a user's face in various interactive environments with limited or no perceptible delay.

Figure 1:
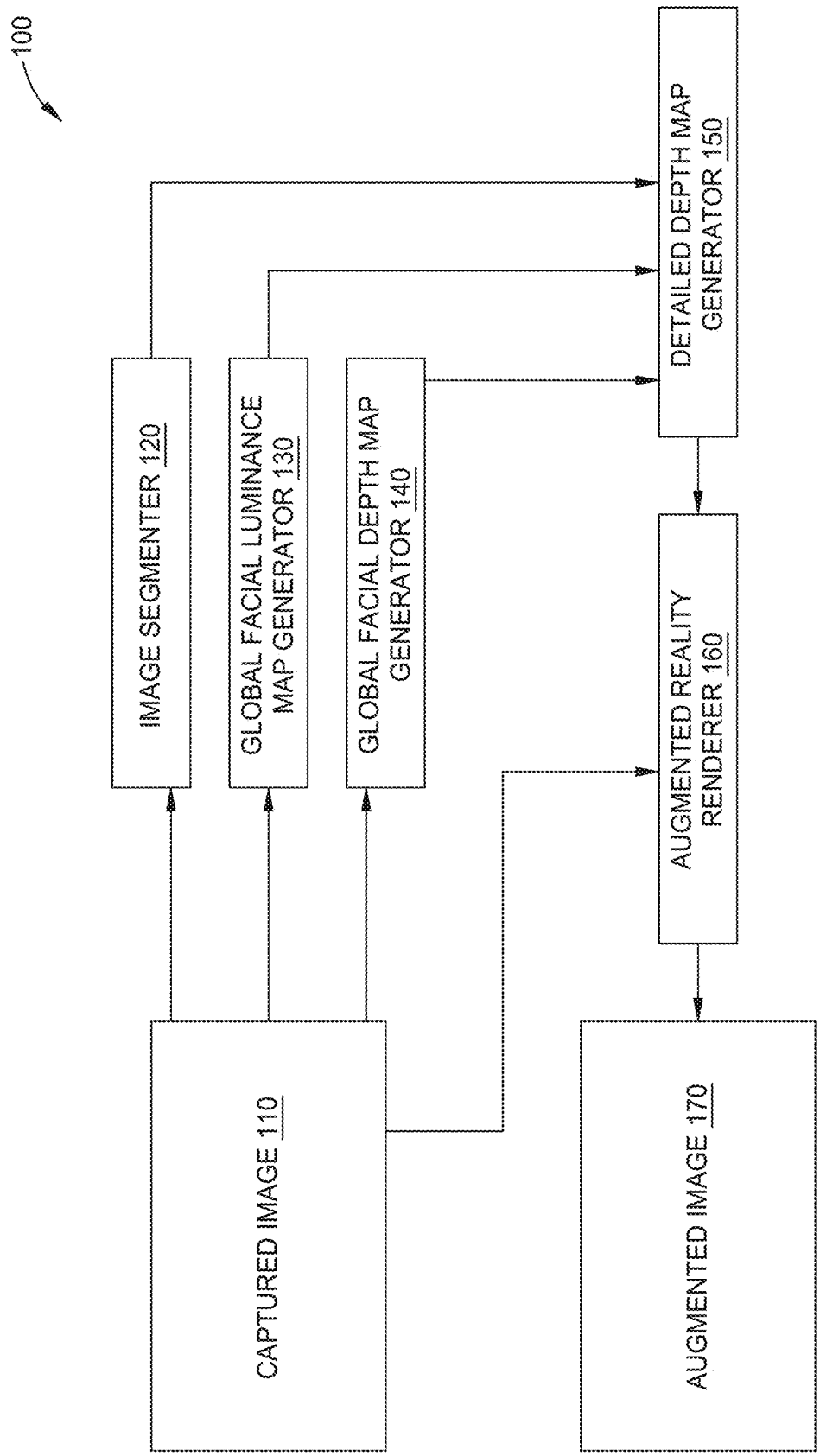
FIG. 1 illustrates an image processing pipeline in which visual effects are rendered over a user's face in a captured image in real time based on segmentation of the captured image, according to one embodiment described herein.

FIG. 1 illustrates a block diagram of an image processing pipeline 100 in which visual effects are rendered over a user's face in a captured image in real time based on segmentation of the captured image. As illustrated, image processing pipeline 100 captures an image 110 and passes the image through an image segmenter 120, a global facial luminance map generator 130, a global facial depth map generator 140, a detailed depth map generator 150, and an augmented reality renderer 160 to generate an augmented image 170. Image processing pipeline may execute, for example, on a mobile phone, tablet, or other computing device capable of receiving an image as input, processing the image using one or more general-purpose processors (e.g., central processing units) or special-purpose processors (e.g., graphics processing units (GPUs), neural processing units (NPUs), application specific integrated circuits (ASICs), etc.).

The captured image 110 may be an image captured by one or more cameras connected with or integral to a device on which image processing pipeline 100 executes. While one captured image is displayed in image processing pipeline 100, it should be recognized that the captured image 110 may be a single frame in a stream of images captured by a video capture system. The techniques described herein may be configured to process images in real-time so that visual effects can be rendered on the captured image 110 and successive captured images in a stream of images with minimal or no perceptible delay from image capture to display on a display device.

In some embodiments, the captured image 110 may be captured by the one or more cameras as a color image in the YCbCr color space, in which the image is represented as a luminance channel (Y) and two chrominance (color) channels (Cb and Cr, corresponding to a blue difference channel and a red difference channel, respectively). In some embodiments, where the captured image 110 is captured in another color space (e.g., Rec. 709, DCI-P3, sRGB, etc.), a luminance channel can be generated for the captured image 110 by converting the image to a greyscale image. As discussed in further detail below, the luminance channel may be used to generate the global luminance map, global depth map, and detailed depth map, while the chrominance channels may be discarded in rendering visual effects over the captured image 110 but used to render the captured image 110 on a display of a computing device. In some embodiments, the captured image 110 may be captured at a camera native resolution that is different from the resolution of a screen on which the image is displayed. For example, an image may be captured by one or more cameras connected with or integral to a computing device at a resolution of 720p (e.g., 1280 pixels wide by 720 pixels tall), while a display of the computing device may have a higher native resolution (e.g., 1080p, WQHD, 4K, etc.). Because larger images generally require more computing resources to process, the computing device can process the captured image at the resolution at which the image was captured and upsize the image prior to display so that the image, including any effects rendered thereon, is rendered at the native resolution of the display.

In some embodiments, the captured image 110 may be output from an image device with information from an augmented library image processing library identifying positional and rotational information for the user's face in the captured image 110. The positional and rotational information may include, for example, one or more virtual anchors defining the boundaries of the user's face in the captured image. Using the virtual anchors, an image processor can use a predefined low-geometry mesh object to generate a high level topology for the face. The high level topology for the face may conform a generic face model to match the dimensions, shape, and current expression of the user's face detected in the captured image. As discussed in further detail below, the high level topology may be used as a basis for overlaying content in a detail-preserving manner.

In some embodiments, one or more blend-shape coefficients may be used to retrieve a high-level model of the user's current facial expression, which may include a series of coefficients representing the movement of facial features relative to neural configurations. The blend-shape coefficients can be used, for example, to animate content in two dimensional spaces and three dimensional spaces in manners that follow the user's current facial expression.

The image segmenter 120 is generally configured to partition the captured image 110 into a plurality of segments which may be processed in parallel by one or more processing units to generate a detailed depth map which may in turn be used to render one or more visual effects on a user's face in the captured image in such a manner that retains details in the captured image 110. In some embodiments, the image segmenter 120 may be configured to partition the image using a fixed partition size (e.g. into a plurality of segments, each having a size of n pixels square). In some embodiments, the image segmenter 120 may partition the image based on the computing capabilities of the computing device on which imaging pipeline 100 executes. For example, based on an assumed or tested processing time for generating a depth map for various segment sizes, the image segmenter 120 can select a segment size that results in the generation of a detailed depth map and rendering of visual effects over a portion of the captured image in less than the duration of a frame captured in a live feed by a camera connected with or integral to the computing device. The visual effects may be set to be rendered, for example, within a threshold amount of time from receiving the captured image 110 from an imaging device. The threshold amount of time may be based on a frame rate at which the imaging device captures images in a stream of images and, in any event, may be set such that images displayed to a user appear to be a continuous stream of images (e.g., 24 frames per second as used in various high definition recording codecs and the ATSC standard, 29.97 frames per second as defined in the NTSC standard, etc.). Generally, smaller segment sizes, resulting in generation of a larger number of segments from the captured image, may result in higher image quality at the expense of processing speed. Conversely, larger segment sizes may result in the generation of a smaller number of segments from the captured image, which may in turn allow for faster generation of the detailed depth map and visual effects therefrom at the expense of rendered image quality or an amount of detail included in the rendered visual effects.

The global facial luminance map generator 130 generally uses the luminance channel of a captured image to aid in reconstructing fine geometry details as texture elements are rendered by a graphics processor. The facial luminance map generator 130, for example, can generate the global facial luminance map based on the identified anchors for the user's face in the captured image. A luminance map for content outside of the boundaries of the user's face, as indicated by the identified anchors, may include data indicating that such portions of the captured image are not included in the image map. Generally, in the luminance map, wrinkles, facial hair, or other fine detail may be represented by darker areas, while smooth skin or other areas lacking fine detail may be represented by lighter areas.

The global facial depth map generator 140 generally uses the captured image to generate a global depth map that preserves some detail about contours or other information on the user's face for use in generating the detailed depth map. The global depth map may use the low geometry mesh object to create a depth map for the user's face. The global depth map may be a high-level depth map that includes information about the general contours of a user's face in the captured image (e.g., locations of eyes, nose, mouth, etc.), but may not include finer detail. As discussed in further detail below, finer detail can be included in a detailed depth map generated based on the global facial luminance map generated by the global facial luminance map generator 130 and the global facial depth map generated by the global facial depth map generator 140 on a per-segment basis, and the detailed depth map can be used to render visual effects on the captured image.

The detailed depth map generator 150 generally uses the image segments generated by the image segmenter 120, the global facial luminance map generated by the global facial luminance map generator 130, and the global facial depth map generated by the global facial depth map generator 140 to generate a detailed depth map corresponding to the user's face. Generally, the detailed depth map may preserve three-dimensional details on the user's face in the captured image 110 such that visual effects rendered using the detailed depth map includes the preserved three-dimensional details. To generate the detailed depth map for a user's face in captured image 110, the detailed depth map generator 150 can process segments of the captured image in parallel to solve a least square problem for each segment in the captured image, as discussed in further detail below.

To preserve facial detail, a displacement energy E over the captured image may be represented by the equation $E=\|D^*-D\|^2+\|\nabla D^*-\nabla L\|^2+\|\Delta D\|^2$. In this equation, D represents the global facial depth map generated by global facial depth map generator 140, L represents the global facial luminance map generated by global facial luminance map generator 130, and $D^*$ represents a detailed depth map which may be used to render visual effects on a user's face in captured image 110. Generally, the displacement energy may thus be a summation of (1) a difference between a detailed depth map and the global facial depth map, (2) a difference between a gradient calculated for the detailed depth map and a gradient calculated for the luminance map, and (3) a smoothing term for each segment of an image.

To allow for real-time generation of a detailed depth map, a least square solution for the displacement energy E may be generated by solving, for each segment of the captured image 110 generated by the image segmenter 120, a linear system $Ax=B$ for each pixel of each segment in the captured image 110. To solve the linear system, a coefficient matrix A and inverse coefficient matrix $A^{-1}$ may be generated for each segment. Coefficient matrix A may be constant, and inverse coefficient matrix $A^{-1}$ may be precomputed. A dimension of the coefficient matrix A for an image segment size of p may be p*p*dim by p*p. Generally, there may be more equations than unknown values in the linear system for the segments of the captured images; thus, the left pseudo-inverse $A^*$ of coefficient matrix A may be calculated according to the equation $A^*=(A^TA)^{-1}A^T$, where $A^T$ represents a transposition of the coefficient matrix A.

To generate a detailed depth map for a segment, the detailed depth map generator 150 also generates a local vector b. Local vector b may be built for each pixel rasterized by a graphics processing unit and may have a dimension of p*p by dim. Local vector b may be built by looping through neighboring pixels.

The pseudo-inverse matrix $A^*$ and local vector b discussed above may be used by a fragment shader to generate a vector x that contains the solved depth value for the p by p pixels in each segment of the image. Vector x may be calculated according to the equation $x=A^**b$ and may be generated, for example, by a fragment shader of a graphics processing unit. Vector x may have a size of p*p by 1 and may include the solved depth value for p by p pixels in each segment of captured image. A value $x_i$ for each pixel $p_i$ may be retrieved from vector x as a graphics processing unit computes a pixel in a thread associated with a specific segment of the captured image. Because vector x contains solved depth values for a segment of an image, it should be recognized that the level of detail contained in a depth map generated from the vectors x may differ based on the size of the segments used to generate the depth map. Smaller segments may allow for the generation of a vector x over a smaller area, which may preserve more detail than larger segments for which a vector x is generated over a larger area; however, smaller segments may involve additional processing expense that may increase an amount of time needed to generate a detailed depth map.

The augmented reality renderer 160 generally uses the detailed depth map generated by the detailed depth map generator 150 and the captured image 110 to generate an augmented image 170. The depth map, as discussed, includes information that the augmented reality renderer 160 can use to shade areas of the captured image 110 in a manner that preserves detail on a user's face in the captured image 110. In some embodiments, the augmented reality renderer 160 can overlay one or more visual effects in an opaque or semi-transparent layer on top of the captured image 110 such that the overlaid visual effects are displayed in the augmented image 170 rather than the captured image of the user's face; however, other elements in the captured image that do not correspond to the user's face may appear as captured by an imaging device.

In some embodiments, the augmented reality renderer 160 can use the detailed depth map generated by the detailed depth map generator 150 and the user's face in the captured image 110 to generate one or more images with different facial expressions. These different facial expressions may be based, for example, on various facial transformation models that include information identifying how different parts of a user's face may move for any given expression. These models may allow for a direction and amount of displacement for each of a plurality of facial features to be modeled for a given expression, and the modeled direction and amount of displacement may be used to modify portions of a captured image and the detailed depth map corresponding to a user's face in the captured image. Using the modeled direction and displacement, the system can adjust the depth map so that the appropriate effects are rendered and detail is retained while rendering these effects. For example, a smile may accentuate various contours (e.g., wrinkles) on a user's face, while a glare or squint may accentuate other contours on the user's face. The modeled direction and displacement may allow for the appropriate contours to be moved in the depth map so that a realistic simulation of a user's facial expression may be rendered on screen.

In some embodiments, the augmented reality renderer 160 can render visual effects on a captured image based on aggregating depth information from a plurality of previously captured images. Segments in the plurality of previously captured images may be aggregated to project segments from the previously captured images to the segment configuration of the current captured image. For example, based on anchors and facial perimeter information, segments corresponding to the same portion of the user's face can be matched in the captured image and the plurality of previously captured images, and the detailed depth maps from each of these segments can be aggregated with the depth map generated for the respective segment in the captured image to increase the accuracy of visual effects rendered on a user's face in the captured image.

Figure 2:
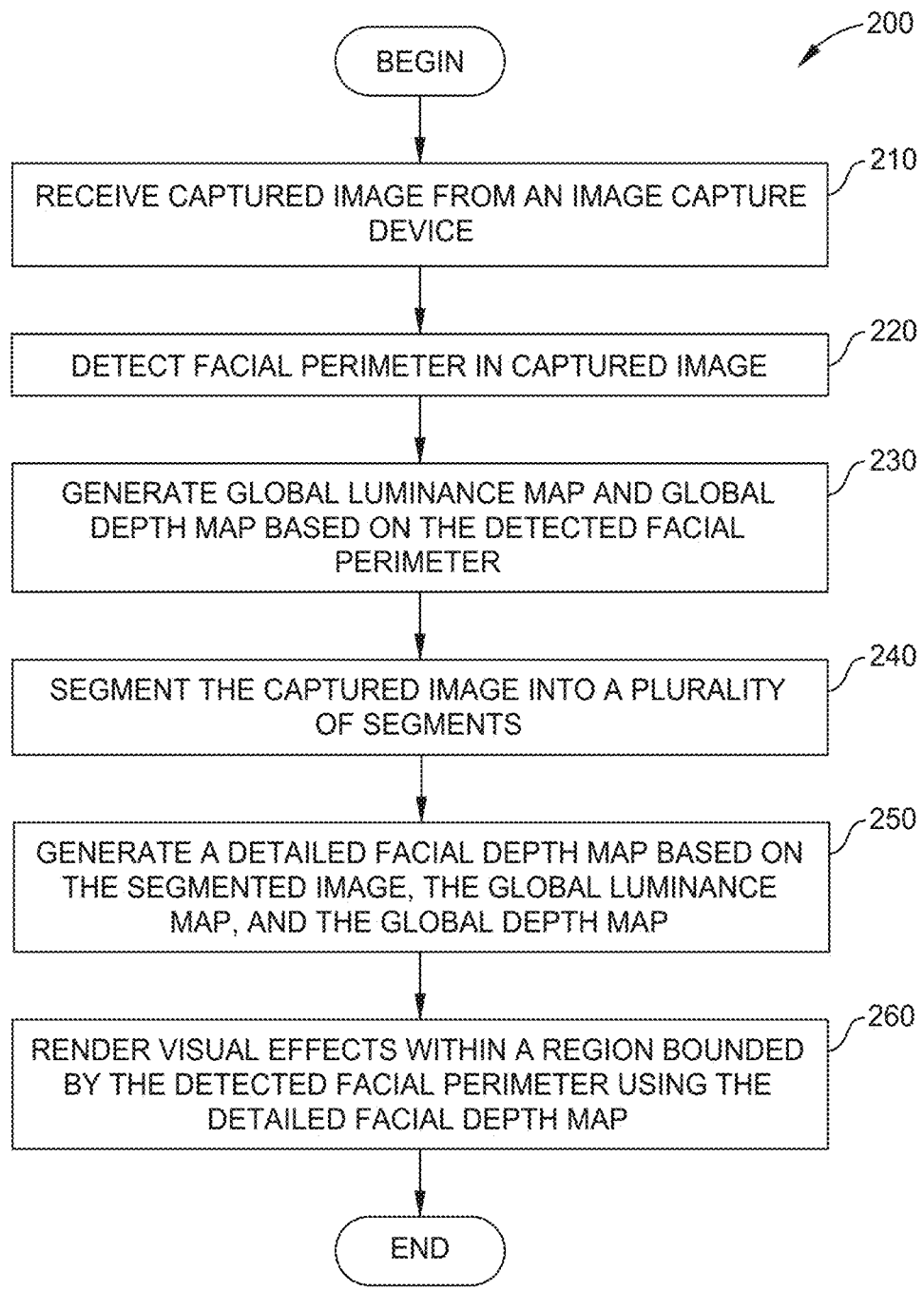
FIG. 2 illustrates example operations for rendering visual effects over a user's face in a captured image in real time, according to one embodiment described herein.

FIG. 2 illustrates example operations 200 that may be performed to render visual effects over a user's face in a captured image in real time, according to embodiments described herein. Operations 200 may be performed on various computing devices, such as smartphones, tablets, desktop computers, laptop computers, or other computing devices that can receive an image input and perform various processing operations in respect of the received image input. In some embodiments, the computing devices on which operations 200 may be performed may be capable of parallel computing such that depth maps for different segments of a captured image may be processed in parallel.

As illustrated, operations 200 begin at block 210, where a system receives a captured image from an image capture device. For example, on a mobile device, the captured image may be received from a front-facing camera such that the captured image can be used, in real time, in one or more multimedia applications (e.g., games, simulators, etc.). The captured image may be received from the image capture device in various color spaces including luminance and, in some embodiments, chrominance data. Luminance data may be received in an independent channel (e.g., the Y channel in a YCbCr color space) or in multiple channels associated with different colors (e.g., the R, G, and B channels in typical RGB color spaces). Where a single luminance channel is not included for the captured image, the system can generate a luminance channel by converting the captured image to greyscale. In this greyscale image, luminance may be represented by the shade of grey associated with each pixel.

At block 220, the system detects facial perimeters in the captured image. Generally, the detected facial perimeters may include portions of the user's face on which visual effects may be rendered and may exclude portions of the user's face and other areas of the image for which visual effects are not to be rendered. In one example, the facial perimeters may be set to encompass an area from a user's hairline to the user's chin, vertically, and may generally follow the contours of the user's face, excepting the user's ears. In some embodiments, where visual effects are to be rendered over the entirety of a user's head and not solely on the user's face, the perimeters may change to include the user's hair, ears, and other areas excluded from the perimeter. In some embodiments, the facial perimeters may include one or more apertures over which visual effects may not be rendered. For example, the user's eyes and mouth may be represented in the detected perimeters as apertures for which effects are not to be rendered.

At block 230, the system generates a global luminance map and a global depth map based on the detected facial perimeter and the captured image. As discussed, the global luminance map may preserve luminance information corresponding to fine details on the user's face (e.g., wrinkles, facial hair, etc.) and may be generated from the luminance channel of the captured image within the boundaries of the detected facial perimeters. The global depth map may be a low-geometry mesh object that represents a high-level topology of the user's face. This high-level topology may identify a general contour of the user's face (e.g., the depth or height of major facial features, such as the user's nose, mouth, eyes, etc.) but may not include depth information for finer features, such as wrinkles or facial hair.

At block 240, the system segments the captured image into a plurality of segments. In some embodiments, the segments may be sized according to an a priori defined set of dimensions (e.g., 10 pixels wide by 10 pixel tall). In some embodiments, the system can select a segment size based on the processing capabilities of the system and timing information. The selected segment size may allow higher performance devices to generate depth maps and render visual effects with greater fidelity to fine detail on a user's face, while the selected segment size may allow lower performance devices to do so with less fidelity to fine detail on the user's face but with the use of fewer computing resources.

At block 250, the system generates a detailed facial depth map based on the segmented image, the global luminance map, and the global depth map. As discussed, the detailed facial depth map may be generated by processing each segment in the segmented individually. In some embodiments, to allow for real-time rendering of visual effects on the user's face in a captured image, segments of the image may be processed in parallel. To generate the detailed facial depth map, the system can solve a least square minimization problem locally for each segment. The resulting detailed depth map for each segment may be a vector including solved depth data for the pixels in the respective segment of the image, and the vector may be used in a rendering pipeline to render one or more visual effects on the user's face in a manner that preserves details of the user's face. Various techniques for generating the detailed facial depth map are described in greater detail in FIG. 3 below.

At block 260, the system renders visual effects within a region bounded by the detected facial perimeter using the detailed facial depth map. Generally, by rendering visual effects within the region bounded by the detected facial perimeter, visual effects may be rendered on the user's face, while leaving other elements in the captured image unaffected by the rendering. This may allow for an augmentation of the captured image with rendered visual effects. In some embodiments, to create a virtual reality environment, other visual effects may be rendered outside of the detected facial perimeter so that the user appears to be in an environment different from the real-world environment in which the captured image was taken.

Figure 3:
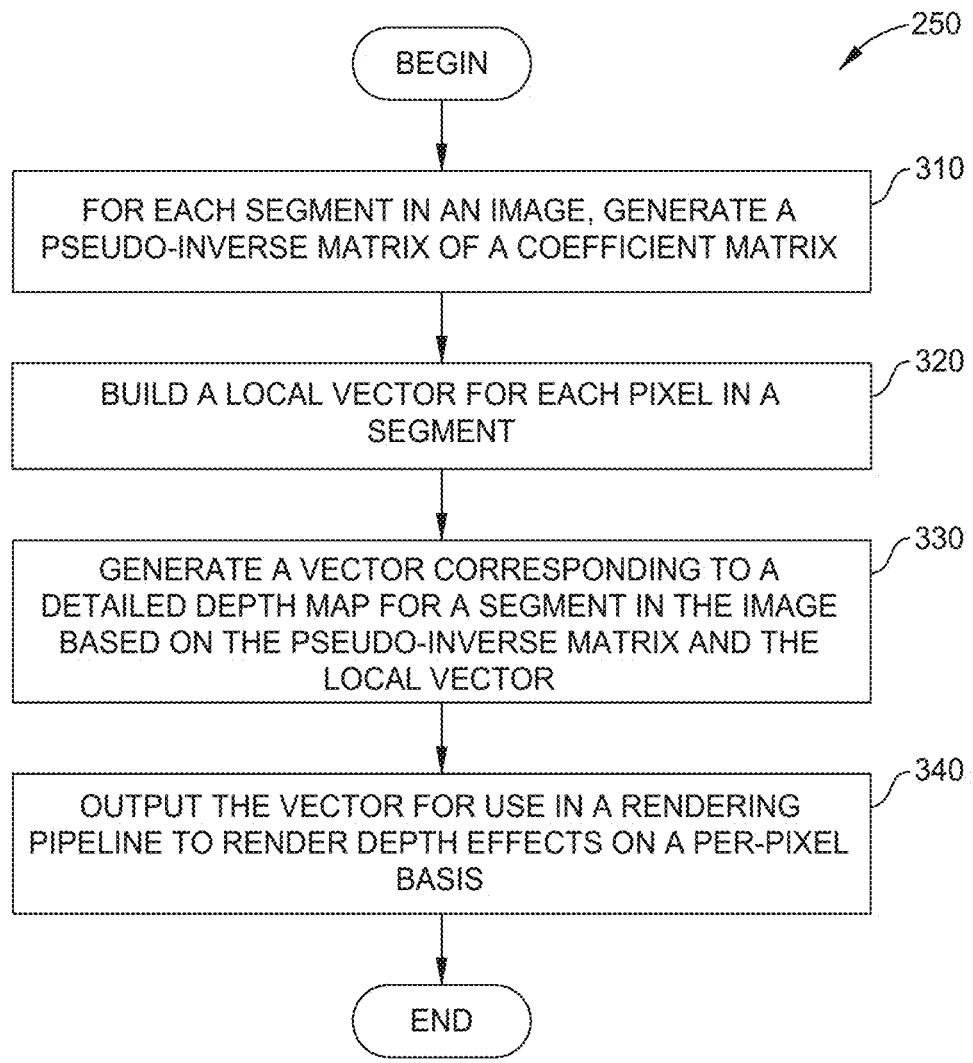
FIG. 3 illustrates example operations for generating a depth map used in rendering visual effects over a user's face in a captured image in real time, according to one embodiment described herein.

FIG. 3 illustrates further details of block 250 in FIG. 2 in which a detailed facial map is generated for a user's face in a captured image. As discussed, the detailed facial map may be generated by minimizing a displacement energy E for the user's face in the captured image. The displacement energy E is generally defined by relationships between a detailed depth map D*, a global depth map D, and a global luminance map L (e.g., where the displacement energy E is represented by the equation $E=\|D^*-D\|^2+\|\nabla D^*-\nabla L\|^2+\|\Delta D\|^2$). To minimize the displacement energy E and generate a detailed depth map D* that minimizes the displacement energy E, a linear system Ax=b may be solved for each segment of the captured image to generate a detailed depth map vector x for each segment that a rendering pipeline can use to apply a visual effect to the particular segment of the captured image.

As illustrated, operations 250 may begin at block 310, where the system generates a pseudo-inverse matrix of a coefficient matrix for each segment in the segmented image. The coefficient matrix may be constant for each segment, and an inverse matrix may be precomputed. The pseudo-inverse matrix may, in some embodiments, be the left pseudo-inverse matrix of the coefficient matrix A and may be computed based on a transpose matrix of the coefficient matrix and the coefficient matrix according to the equation $A^*=(A^TA)^{-1}A^T$.

At block 320, the system builds a local vector for each pixel in a segment. The local vector b may have dimensions of p*p by dim pixels, where p represents a segment pixel size (e.g., n pixels square) and dim represents a dimension of each segment. As discussed, to build to local vector, a system can loop through the p by p neighboring pixels.

At block 330, the system generates a vector corresponding to a detailed depth map for a segment in the image based on the pseudo-inverse matrix and the local vector. As discussed, the detailed depth map vector x may be calculated according to the equation x=A**b to solve the linear system Ax=b, which results in a vector x having a size of p*p by 1. As discussed, vector x may be generated such that the displacement energy E represented by the equation $E=\|D^*-D\|^2+\|\nabla D^*-\nabla L\|^2+\|\Delta D\|^2$ is minimized. By solving for the detailed depth map vector x using a pseudo-inverse matrix A* and a vector b, a least square minimization may be performed for each pixel in a segment. Correspondingly, performing a least square minimization over each segment in the captured image may result in the performance of a least square minimization over the entirety of the captured image (or a relevant portion of the captured image, such as the area bounded by the boundaries of a user's face).

At block 340, the system outputs the vector for use in a rendering pipeline to render depth effects on a per-pixel basis. As discussed, a rendering pipeline can use the vectors for each segment of the captured image, in conjunction with shading, texturing, and other graphical properties, to apply a visual effect to each segment of the captured image. In one example, suppose that an augmented reality application is configured to change the user's face from a natural color to a color associated with a character in a virtual universe. The rendering pipeline can use the color information and the detailed depth map on a per-segment basis to render visual effects on the user's face while maintaining facial detail identified in the detailed map. For example, where wrinkles are represented as darker areas in a luminance and detailed depth map, adjustments can be made to pixels associated with wrinkles in the captured image so that these pixels are darker than pixels associated with smoother skin in the captured image. In some embodiments, additional visual effects may be rendered over the user's face. For example, if an application is configured to apply a metallic effect to the surface of a user's face, lighting information can be used to illuminate various regions of the user's face in a manner similar to that of a metallic real-life surface. Further, reflection and refraction effects can be rendered on other surfaces in the captured image based on light reflection and refraction effects and a material rendered on a user's face.

Figure 4:
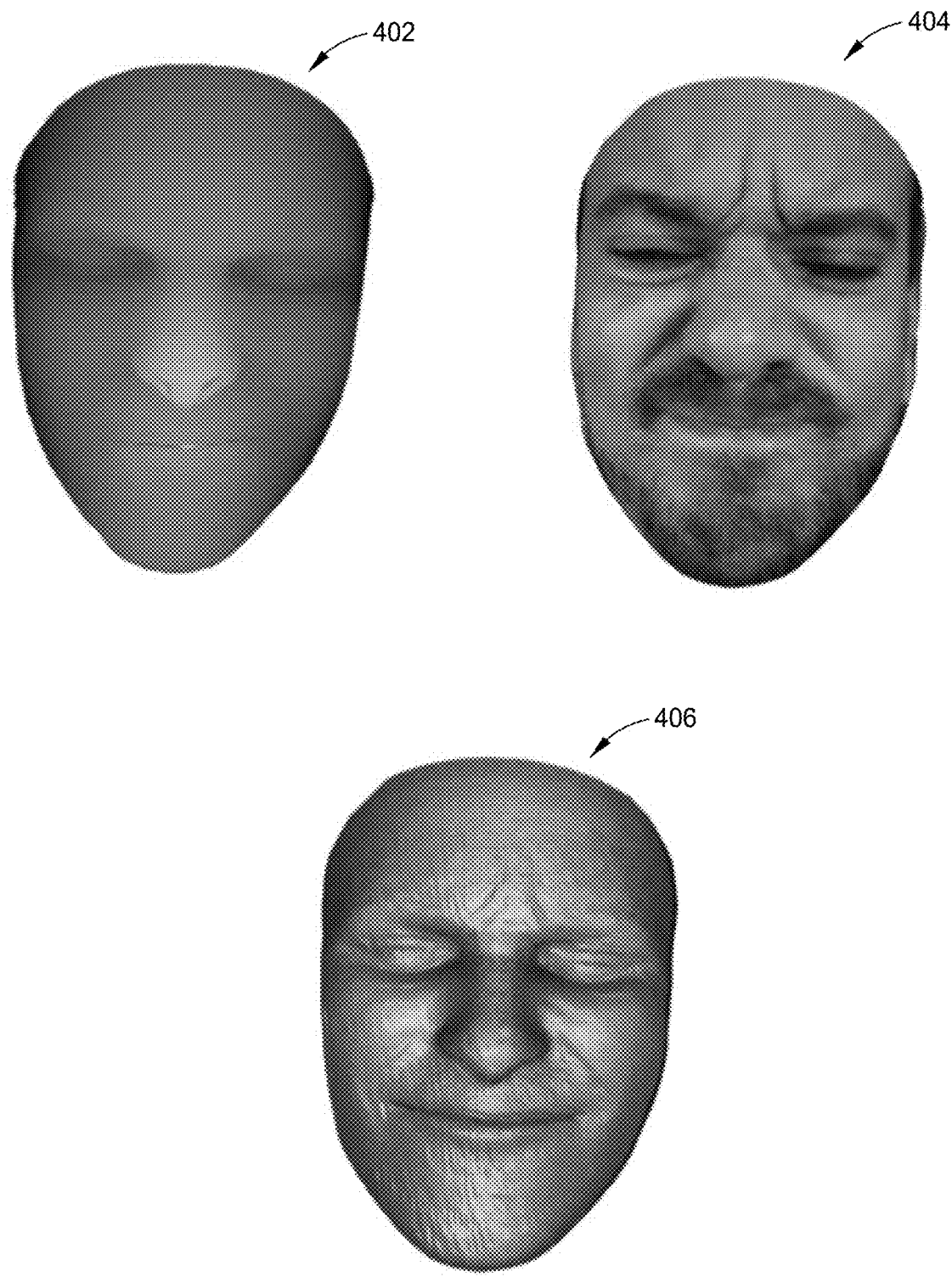
FIG. 4 illustrates example global luminance and depth maps and rendered visual effects over a user's face in a captured image, according to one embodiment described herein.

FIG. 4 illustrates examples of depth maps, luminance maps, and detailed depth maps generated from a captured image for rendering detail-accurate effects on a user's face in a captured image, according to an embodiment described herein.

Depth map 402 is illustrative of a global facial depth map that includes high-level detail about the contours of a user's face but does not include information about fine detail on the user's face. Generally, the global facial depth map may be generated from a predefined mesh object representing a high level topology for a face. As illustrated, depth map 402 does not include information such as facial hair, wrinkles, and other lines on a face, but does include information corresponding to a height or depth of major features on the user's face. For example, the user's eyes can be seen as areas that are deeper than a planar surface of the user's face, while the user's nose can be seen as an area that is raised relative to a planar surface of the user's face. Skin detail, however, is illustrated as a smooth surface.

Luminance map 404 includes luminance data for the user's face that may be generated from a luminance channel in a captured image. Luminance map 404, when combined with depth map 402 as discussed above, preserves detailed features when generating the detailed depth map 406 discussed below and performing three-dimensional facial detail reconstruction. The combination of depth map 402 and luminance map 404 to generate detailed depth map 406 may be performed in real-time.

Detailed depth map 406 generally represents a depth map including fine geometry details from a user's face that embodiments of the present disclosure are configured to preserve for use in an image rendering pipeline that reconstructs facial detail and renders effects over a user's face in a captured image including the reconstructed facial detail. As discussed, detailed depth map 406 may be generated on a per-segment basis, where a depth map for each segment is created independently by solving a least square minimization problem for each segment. Generally, a displacement energy may be minimized based on relationship between detailed depth map 406, depth map 402, luminance map 404, gradients for the detailed depth map 406 and luminance map 404, and a smoothing factor.

To generate the detailed depth map 406, a linear system Ax=b for each segment in the captured image may be solved, where A represents a coefficient matrix for each segment and b represents a local vector computed over the pixels in each segment. As discussed, to solve the linear system, a pseudo-inverse matrix A* may be generated from coefficient matrix A and a transpose matrix $A^T$, which generally represents a transposition of matrix A over a diagonal of the matrix. For example, the pseudo-inverse matrix A* may be represented by the equation $A^*=(A^T A)^{-1}A^T$. Given the pseudo-inverse matrix A* and local vector b, a vector x may be generated to include values corresponding to fine detail captured on a user's face. Vector x may be represented by the equation x=A**b and may include mappings of the solved depth value for each pixel in a segment of the captured image.

Detailed depth map 406, which is defined by a plurality of vectors x over a plurality of segments in the captured image, may be used by a graphics processing unit or other graphical renderer to render visual effects over the user's face in the captured image. Generally, these visual effects may be rendered such that fine detail is preserved in the rendered visual effects. For example, given a layer in which a visual effect is rendered and added to a captured image with an alpha (transparency) value of 0, rendering visual effects using detailed depth map 406 may result in visual effects retaining the fine detail (e.g., wrinkles, laugh lines, facial hair, etc.) on the user's face. In some embodiments, some amount of transparency may be allowed to blend the rendered visual effects with the details of a user's face in a captured image. In such a case, dithering or other rendering techniques can be used to combine the captured image with the rendered visual effects to minimize ghosting, double image issues, or other artifacts that may result from combining the captured image with a semi-transparent layer on which the visual effects are rendered.

Figure 5:
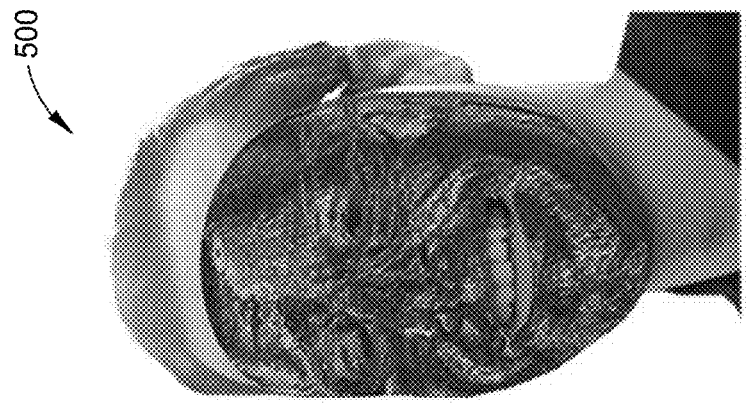
FIG. 5 illustrates example renderings of visual effects over a user's face in a captured image, according to one embodiment described herein.
Figure 5:
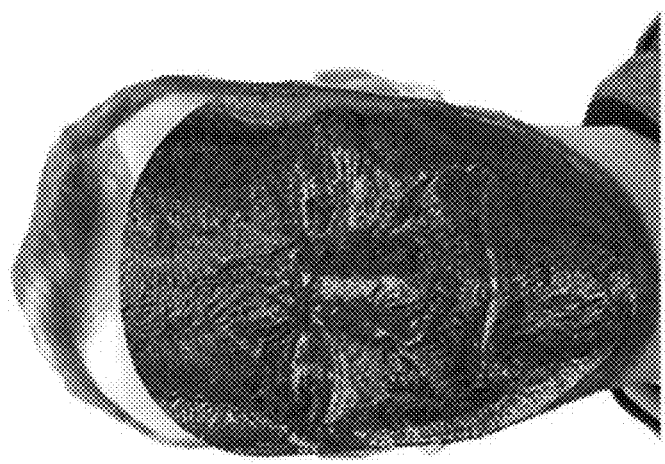
Figure 5:

FIG. 5 illustrates examples of visual effects rendered over a user's face in a captured image, according to an embodiment described herein.

Renderings 500, as discussed, may be generated based on a detailed depth map generated on a per-segment basis using a global facial depth map including high-level detail about the contours of a user's face and a luminance map. Visual effects illustrated in renderings 500 may, for example, include various texture and lighting effects based on a simulated material overlaid on the user's face using the detailed depth map. For example, lighting effects may use luminance information from the luminance map and the properties of the simulated material overlaid on the user's face to render various effects on the user's face.

As illustrated, a metallic surface may be overlaid on the user's face, following the details of the user's face captured in the detailed depth map. Based on reflectivity properties defined for the metallic surface and relative luminance information for different portions of the user's face, different portions of the user's face may be rendered with more or less brightness. For example, to identify brighter and darker portions of the user's face, a neutral luminance value may be defined as a midpoint between a highest luminance value on the user's face and a lowest luminance value on the user's face. Lighting effects may be rendered with progressively higher reflectivity as the luminance value increases (e.g., as areas on a user's face increase in brightness) and with lower reflectivity as the luminance value decreases. Generally, the visual effects may be rendered on a per-pixel basis based on the detailed depth map so that visual effects overlaid on a user's face in an image reflect, in real-time, luminance differences between different portions of the user's face and the details captured in the detailed depth map.

Figure 6:
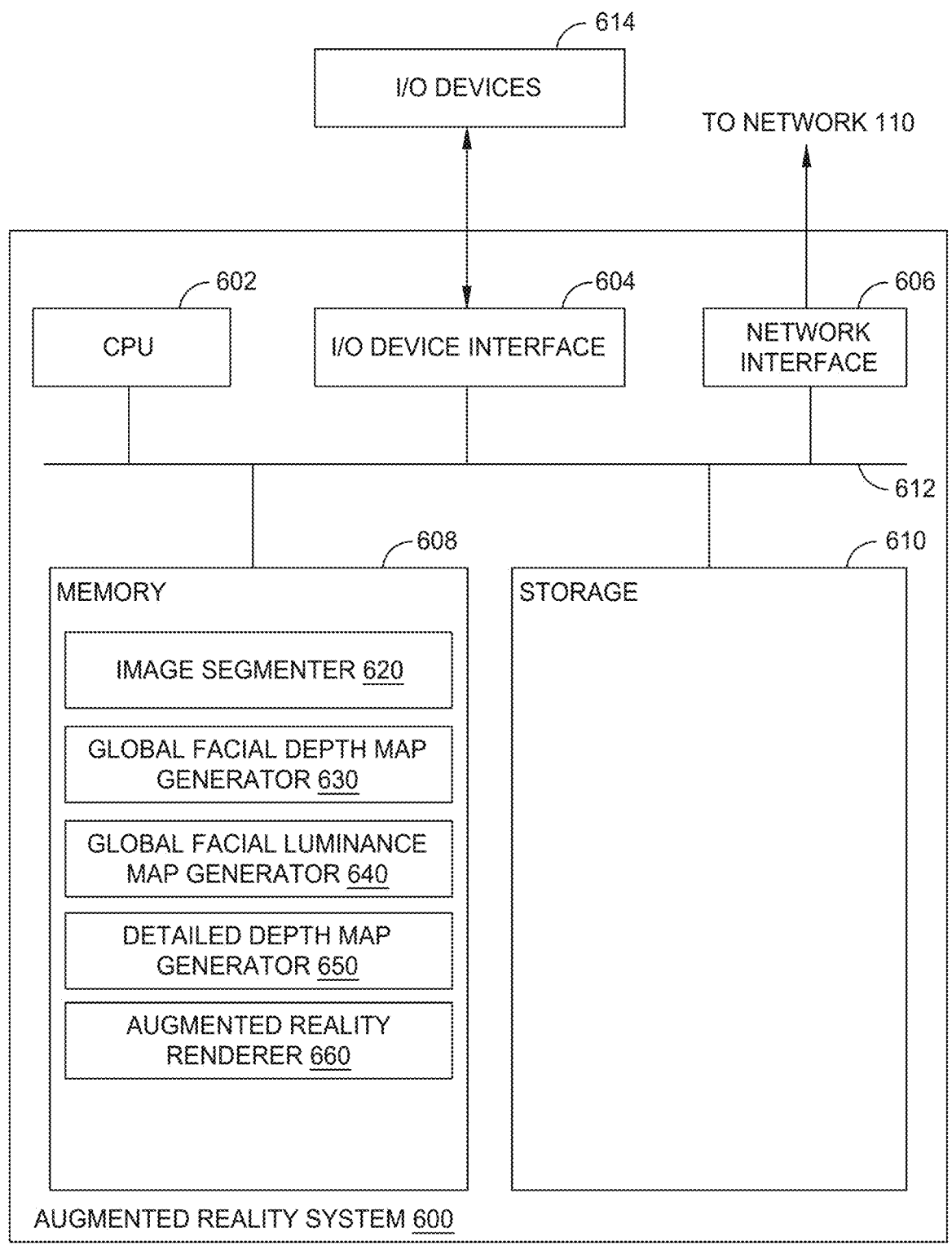
FIG. 6 illustrates an example system for rendering visual effects over a user's face in a captured image in real time based on segmentation of the captured image, according to one embodiment described herein.

FIG. 6 illustrates an example augmented reality system 600 that renders visual effects on captured images of a user's face using a detailed depth map built on a per-segment basis. System 600 may be representative, for example, of a computing device that can host the imaging pipeline 100 illustrated in FIG. 1.

As illustrated, system 600 includes a central processing unit (CPU) 602, one or more I/O device interfaces 604 that may allow for the connection of various I/O devices 614 (e.g., keyboards, displays, mouse devices, pen input, imaging devices, etc.) to the server 600, network interface 606 through which server 600 is connected to network 690 (which may be a local network, an intranet, the internet, or any other group of computing devices communicatively connected to each other), a memory 608, storage 610, and an interconnect 612.

CPU 602 may retrieve and execute programming instructions stored in the memory 608. Similarly, the CPU 602 may retrieve and store application data residing in the memory 608. The interconnect 612 transmits programming instructions and application data, among the CPU 602, I/O device interface 604, network interface 606, memory 608, and storage 610.

CPU 602 is included to be representative of a single CPU, multiple CPUs, a single CPU having multiple processing cores, and the like. In some embodiments, CPU 602 may include or outsource work to one or more specialized processing units, such as a graphics processing unit (GPU), tensor processing unit (TPU), neural processing unit (NPU), or other processing units that are capable of performing operations in parallel.

Memory 608 is representative of a volatile memory, such as a random access memory, or a nonvolatile memory, such as nonvolatile random access memory, phase change random access memory, or the like. As illustrated, memory 608 includes an image segmenter 620, global facial depth map generator 630, global facial luminance map generator 640, detailed depth map generator 660, and augmented reality renderer 660.

Image segmenter 620 generally receives a captured image from an imaging device connected with or integral to augmented reality system 600 and segments the captured image into a plurality of segments which can be independently processed (e.g., by detailed depth map generator 660). In some embodiments, image segmenter 620 can segment the captured image into a plurality of segments based on an a priori defined segment size. In some embodiments, image segmenter 620 can determine a size of the segment based on performance characteristics of the augmented reality system 600 such that smaller segments can be used by higher performance systems and larger segments can be used for systems with more limited computing resources.

Global facial depth map generator 630 generally generates a low-geometry map of the user's face in a captured image for use by detailed depth map generator 660 in generating the detailed depth map. To do so, global facial depth map generator 630 can use the perimeter of the user's face, which may be identified by an augmented reality toolkit through which the captured image was obtained, to set the area for which the global facial depth map is generated. The global facial depth map can use a low geometry model to generate a depth map that includes depth and height information for major features on a user's face but uses a smooth texture that omits fine detail from the global facial depth map.

Global facial luminance map generator 640 generates a global luminance map for use by detailed depth map generator 650 in generating the detailed depth map. The global luminance map may be generated using the perimeter of the user's face and the luminance channel for the captured image to extract detail information from the captured image that can be used in generating the detailed depth map.

Detailed depth map generator 650 uses the global depth map, global luminance map, and segments of a captured image to generate a detailed depth map of the user's face on a per-segment basis. Generally, detailed depth map generator 650 performs a least square minimization to generate a depth vector for each segment of the captured image. The detailed depth map may be used by augmented reality renderer 660 to render one or more visual effects over a user's face. The rendered one or more visual effects generally include fine detail, such as wrinkles, facial hair, and the like, that is identified in the detailed depth map so that the rendered visual effects appear to retain details of the user's face recorded in the captured image.

Storage 610 is representative of a non-volatile memory, such as a disk drive, solid state drive, or a collection of storage devices distributed across multiple storage systems. Although shown as a single unit, the storage 610 may be a combination of fixed and/or removable storage devices, such as fixed disc drives, removable memory cards or optical storage, network attached storage (NAS), or a storage area-network (SAN).

In the current disclosure, reference is made to various embodiments. However, it should be understood that the present disclosure is not limited to specific described embodiments. Instead, any combination of the following features and elements, whether related to different embodiments or not, is contemplated to implement and practice the teachings provided herein. Additionally, when elements of the embodiments are described in the form of "at least one of A and B," it will be understood that embodiments including element A exclusively, including element B exclusively, and including element A and B are each contemplated. Furthermore, although some embodiments may achieve advantages over other possible solutions or over the prior art, whether or not a particular advantage is achieved by a given embodiment is not limiting of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, embodiments described herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments described herein may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations or block diagrams of methods, apparatuses (systems), and computer program products according to embodiments of the present disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations or block diagrams.

The flowchart illustrations and block diagrams in the Figures illustrate the architecture, functionality, and operation of possible implementations of systems, methods, and computer program products according to various embodiments of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustrations, and combinations of blocks in the block diagrams or flowchart illustrations, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method for rendering augmented reality effects on an image of a user's face in real time, comprising:
   capturing an image of a face of a user;
   generating a global facial depth map and a luminance map based on the captured image;
   segmenting the captured image into a plurality of segments;
   for each segment in the plurality of segments, minimizing a displacement energy of the respective segment using a least square minimization of a linear system for the respective segment, the displacement energy being defined by a relationship between a detailed depth map, the global facial depth map and the luminance map;
   generating the detailed depth map based on the minimized displacement energy for each segment in the plurality of segments, wherein the detailed depth map captures three-dimensional facial details of the user in the captured image; and
   rendering one or more visual effects over the face of the user within the captured image using the generated detailed depth map, wherein a position of the face of the user and the captured three-dimensional facial details of the user in the image are preserved in the rendered one or more visual effects.

2. The method of claim 1, wherein the global facial depth map comprises a low-geometry mesh object representing a high level topology of the face of the user.

3. The method of claim 2, wherein coordinates of the global facial depth map are defined by one or more anchors defining location coordinates of the face of the user within the captured image.

4. The method of claim 1, wherein minimizing the displacement energy for each segment of the plurality of segments comprises solving the linear system for each pixel in each segment in the captured image.

5. The method of claim 1, wherein minimizing the displacement energy for each segment in the plurality of segments comprises minimizing the displacement energy for each of the plurality of segments in parallel.

6. The method of claim 1, wherein:
   the captured image is defined by a luminance channel and a plurality of chrominance channels, and
   the luminance map is generated based on the luminance channel of the captured image with coordinates in the captured image that are coextensive with coordinates defining a boundary of the global facial depth map.

7. The method of claim 1, wherein rendering one or more visual effects over the captured image using the generated detailed depth map comprises:
   rendering the one or more visual effects over the captured image at a capture resolution; and
   upscaling the captured image and the rendered one or more visual effects from the capture resolution to a screen resolution.

8. The method of claim 1, wherein the captured image comprises an image from a stream of images captured by a video capture device.

9. The method of claim 1, wherein a size of each segment in the plurality of segments is defined such that the one or more visual effects can be rendered over the captured image using the detailed depth map prior to a subsequent image in a live stream of images being captured.

10. The method of claim 1, wherein rendering one or more visual effects over the captured image using the generated detailed depth map comprises aggregating renderings from a plurality of previous captured images based on a segment configuration of the captured image on which the one or more visual effects are rendered.

11. A system, comprising:
   a processor; and
   a memory having instructions stored thereon which, when executed by the processor, performs an operation for rendering augmented reality effects on an image of a user's face in real time, the operation comprising:
   capturing an image of a face of a user,
   generating a global facial depth map and a luminance map based on the captured image,
   segmenting the captured image into a plurality of segments,
   for each segment in the plurality of segments, minimizing a displacement energy of the respective segment using a least square minimization of a linear system for the respective segment, the displacement energy being defined by a relationship between a detailed depth map, the global facial depth map and the luminance map,
   generating the detailed depth map based on the minimized displacement energy for each segment in the plurality of segments, wherein the detailed depth map captures three-dimensional facial details of the user in the captured image; and
   rendering one or more visual effects over the face of the user within the captured image using the generated detailed depth map, wherein a position of the face of the user and the captured three-dimensional facial details of the user in the image are preserved in the rendered one or more visual effects.

12. The system of claim 11, wherein the global facial depth map comprises a low-geometry mesh object representing a high level topology of the face of the user.

13. The system of claim 12, wherein coordinates of the global facial depth map are defined by one or more anchors defining location coordinates of the face of the user within the captured image.

14. The system of claim 11, wherein minimizing the displacement energy for each segment of the plurality of segments comprises solving the linear system for each pixel in each segment in the captured image.

15. The system of claim 11, wherein minimizing the displacement energy for each segment in the plurality of segments comprises minimizing the displacement energy for each of the plurality of segments in parallel.

16. The system of claim 11, wherein:
the captured image is defined by a luminance channel and a plurality of chrominance channels, and
the luminance map is generated based on the luminance channel of the captured image with coordinates in the captured image that are coextensive with coordinates defining a boundary of the global facial depth map.

17. The system of claim 11, wherein rendering one or more visual effects over the captured image using the generated detailed depth map comprises:
rendering the one or more visual effects over the captured image at a capture resolution; and
upscaling the captured image and the rendered one or more visual effects from the capture resolution to a screen resolution.

18. The system of claim 11, wherein the captured image comprises an image from a stream of images captured by a video capture device.

19. The system of claim 11, wherein a size of each segment in the plurality of segments is defined such that the one or more visual effects can be rendered over the captured image using the detailed depth map prior to a subsequent image in a live stream of images being captured.

20. A non-transitory computer-readable medium having instructions stored thereon which, when executed by a processor, performs an operation for rendering augmented reality effects on an image of a user's face in real time, the operation comprising:
capturing an image of a face of a user;
generating a global facial depth map and a luminance map based on the captured image;
segmenting the captured image into a plurality of segments;
for each segment in the plurality of segments, minimizing a displacement energy of the respective segment using a least square minimization of a linear system for the respective segment, the displacement energy being defined by a relationship between a detailed depth map, the global facial depth map and the luminance map;
generating the detailed depth map based on the minimized displacement energy for each segment in the plurality of segments, wherein the detailed depth map captures three-dimensional facial details of the user in the captured image; and
rendering one or more visual effects over the face of the user within the captured image using the generated detailed depth map, wherein a position of the face of the user and the captured three-dimensional facial details of the user in the image are preserved in the rendered one or more visual effects.

\* \* \* \* \*